Feb. 6, 1973 G. H. WOODIER 3,715,177
FLUID METERING APPARATUS
Filed Oct. 7, 1970 3 Sheets-Sheet 1
FIG. 1
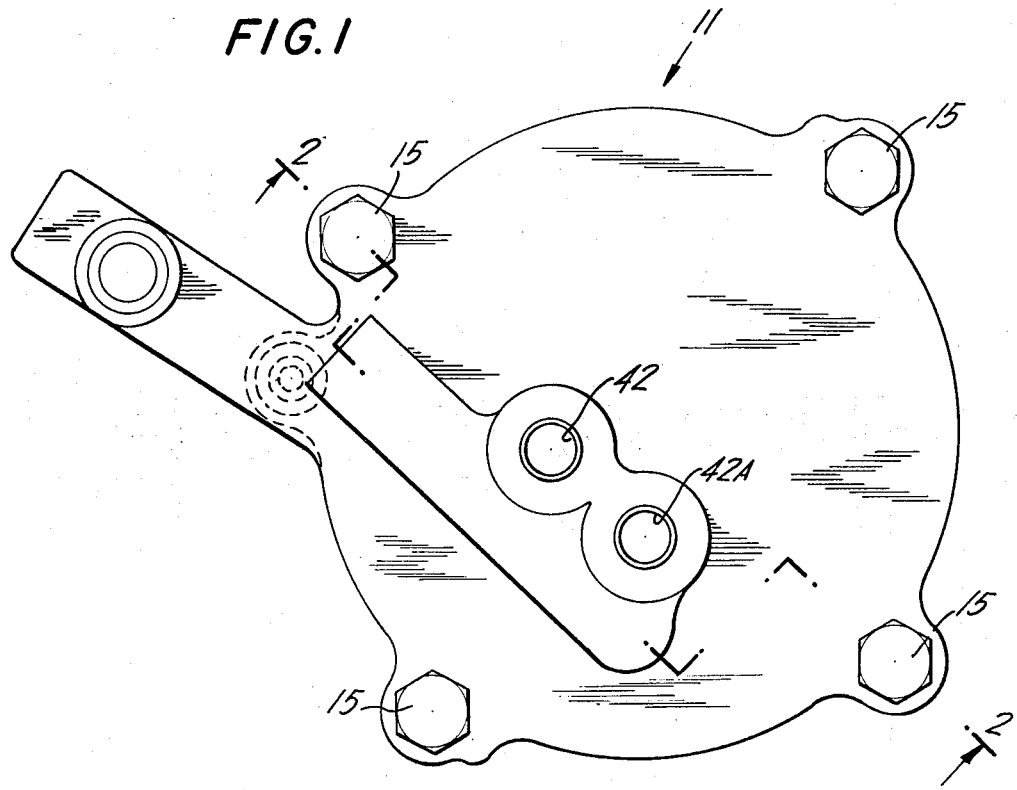
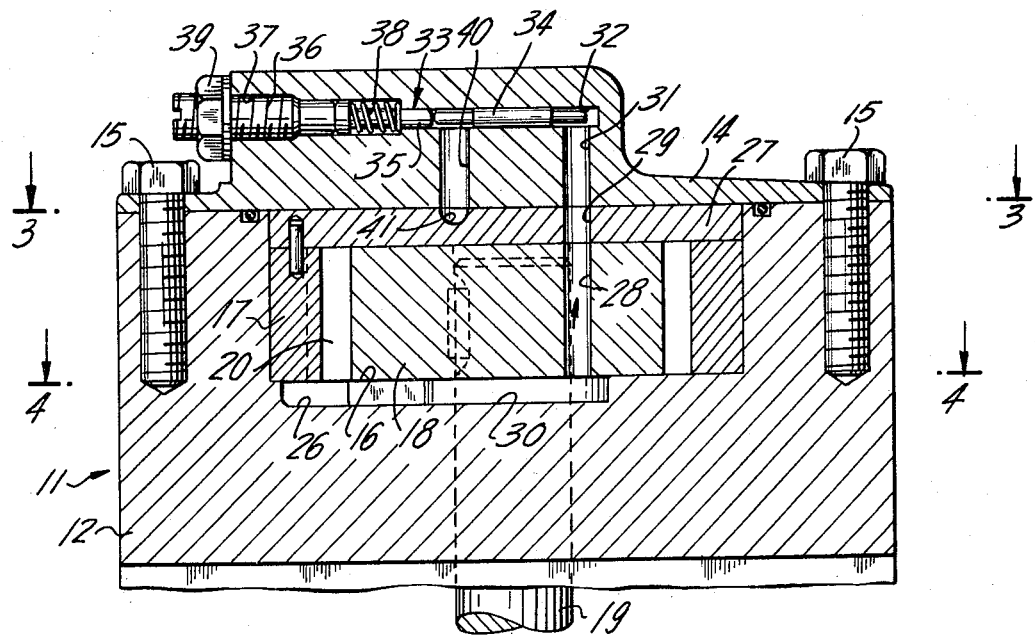
FIG. 2
INVENTOR.
GEORGE H. WOODIER
BY
ATTORNEY

INVENTOR.
GEORGE H. WOODIER
BY
ATTORNEY

Feb. 6, 1973  G. H. WOODIER  3,715,177
FLUID METERING APPARATUS
Filed Oct. 7, 1970  3 Sheets-Sheet 3
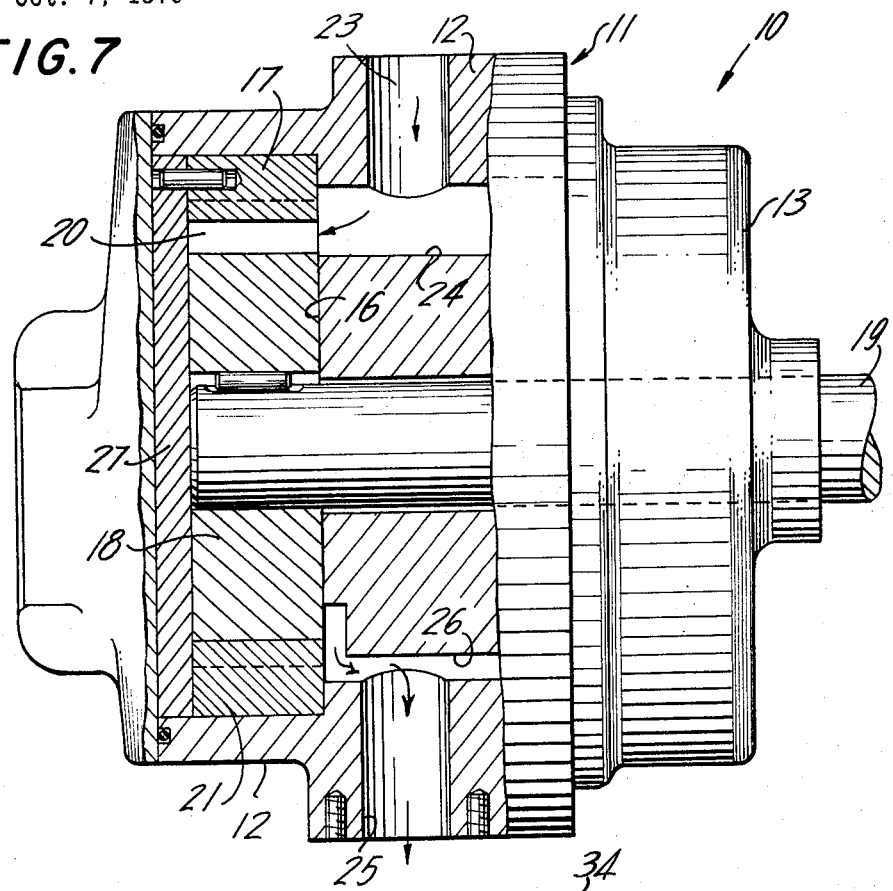
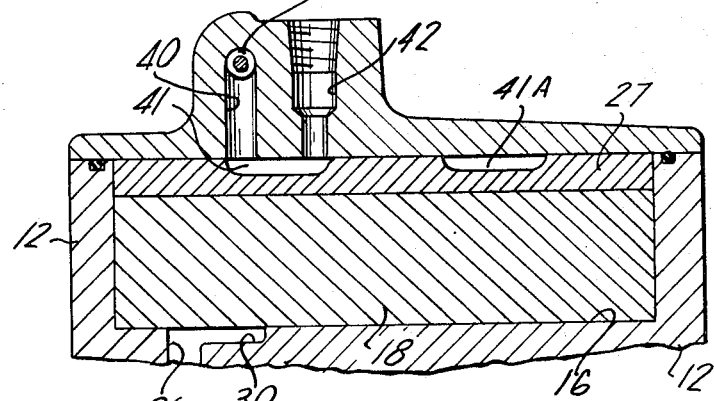
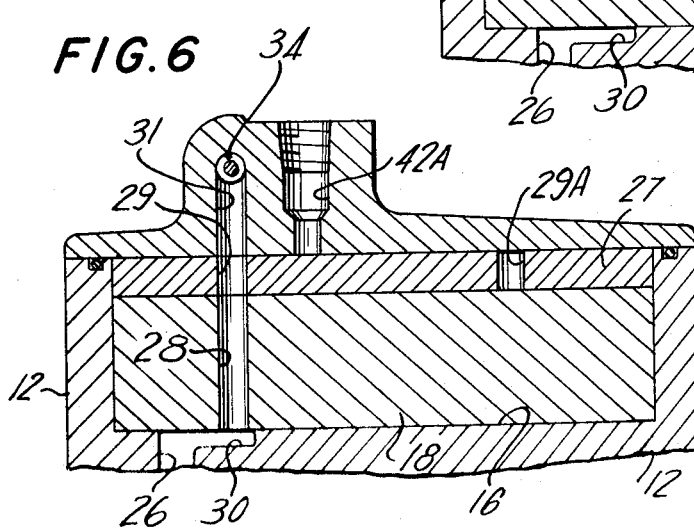
INVENTOR.
GEORGE H. WOODIER
BY
ATTORNEY

United States Patent Office

3,715,177
Patented Feb. 6, 1973

3,715,177
FLUID METERING APPARATUS
George H. Woodier, Ringwood, N.J., assignor to Curtiss-Wright Corporation, Wood-Ridge, N.J.
Filed Oct. 7, 1970, Ser. No. 78,645
Int. Cl. F04c 1/06
U.S. Cl. 418—171
17 Claims

ABSTRACT OF THE DISCLOSURE

A fluid metering apparatus comprising a plurality of rotary members supported in a housing and interconnected to rotate at different angular velocities. The rotary members and the housing having passageways located to come into registry with each other and with a source of pressurized liquid in the housing and a discharge port means in the housing once in every predetermined amount of angular movement of the faster rotating member to thereby periodically communicate the source of pressurized fluid with the discharge port means and flow liquid through the latter.

DISCLOSURE OF THE INVENTION

This invention relates to fluid metering apparatuses and, more particularly, to liquid metering devices for delivering predetermined small quantities of liquid to a place of use or storage.

BACKGROUND OF THE INVENTION

Heretofore, liquid metering apparatuses have been relatively complex and expensive devices, particularly those devices employed to provide lubricant in varying quantities to machinery parts. A typical lubricant metering device is exemplified in the U.S. patent to Kemp, No. 3,172,578. These devices usually are valve mechanism connected to a pump to receive pressurized liquid from the latter and factory adjusted to provide a certain predetermined quantity of lubricant. Many of the existing liquid metering apparatuses are unsatisfactory because they are incapable of providing metered liquid at varying rates of discharge or, if capable of so doing, are relatively complex and expensive.

Accordingly, it is an object of the present invention to provide a fluid metering apparatus of relatively simple and inexpensive construction.

Another object of this invention is to provide a fluid metering apparatus forming an integral part of a fluid pump.

A further object of the present invention is to provide a combined fluid metering device and fluid pump in which the metered fluid rate of discharge automatically varies with change in fluid pump flow rate.

A feature of this invention is the provision of two rotary members geared together in a housing for rotation at different angular velocities and, having passageways in the housing and in each of said two rotary members so located relative to each other that they come into registry once in every predetermined number of revolutions of the faster rotating member and thereby communicate a source of pressurized fluid in the housing with a discharge port to pass fluid to a point of use or storage.

SUMMARY OF THE INVENTION

It is, therefore, contemplated by the present invention to provide a fluid metering device which comprises a housing, a first member and a second member supported in the housing for rotation and interconnected so that the members rotate at different angular velocities. The housing has a chamber for receiving pressurized fluid from a source thereof. A discharge port means is provided in the housing and is connected to a place of fluid use or storage. The housing and each of said first and second members are each provided with passageway means which are so located relative to each other that they come into registry and with the pressurized fluid chamber and discharge port means once in every predetermined number of revolutions of the faster rotating member to thereby communicate the source of pressurized fluid with the discharge passage and pass fluid to a place of use or storage.

In a more limited aspect of the present invention, the apparatus resides in the incorporation of a metering means in a liquid pump. The liquid pump comprises an external gear means and an internal gear means disposed within the housing in eccentric meshing relationship to each other. The external gear means having at least one less tooth than the internal gear means so that rotation of the gears form liquid working chambers between the meshing gear teeth which alternately expand and contract in volume. An inlet port means and an outlet port means is provided in said housing communicating with the working chambers to draw liquid from the inlet port means into the working chambers during expansion of the working chambers and force liquid from such chambers into the outlet port means during contraction of the working chambers. The metering mechanism according to this invention comprises passageway means in the internal and external gears so located that the passageway means come into registry with each other and the outlet port means every predetermined number of revolutions of the external gear means to bleed-off a portion of the liquid pumped from the outlet port means to a place of use or storage.

BRIEF DESCRIPTION OF THE DRAWINGS

The aforesaid and other objects and advantages of the present invention will appear more fully hereinafter from a consideration of the detailed description which follows when taken together with the accompanying drawings wherein one embodiment of the invention is illustrated and in which:

FIG. 1 is an end elevational view of the fluid metering and pumping device according to this invention;

FIG. 2 is a fragmentary cross-sectional view taken substantially along line 2—2 of FIG. 1;

FIGS. 5 and 6 are fragmentary cross-sectional views taken substantially along lines 5—5 and 6—6, respectively, of FIG. 3; and FIG. 7 is a side elevational view of the fluid metering and pumping device shown in FIG. 1 with parts broken away for illustration purposes only.

DESCRIPTION OF THE PREFERRED EMBODIMENT

Figure 3:
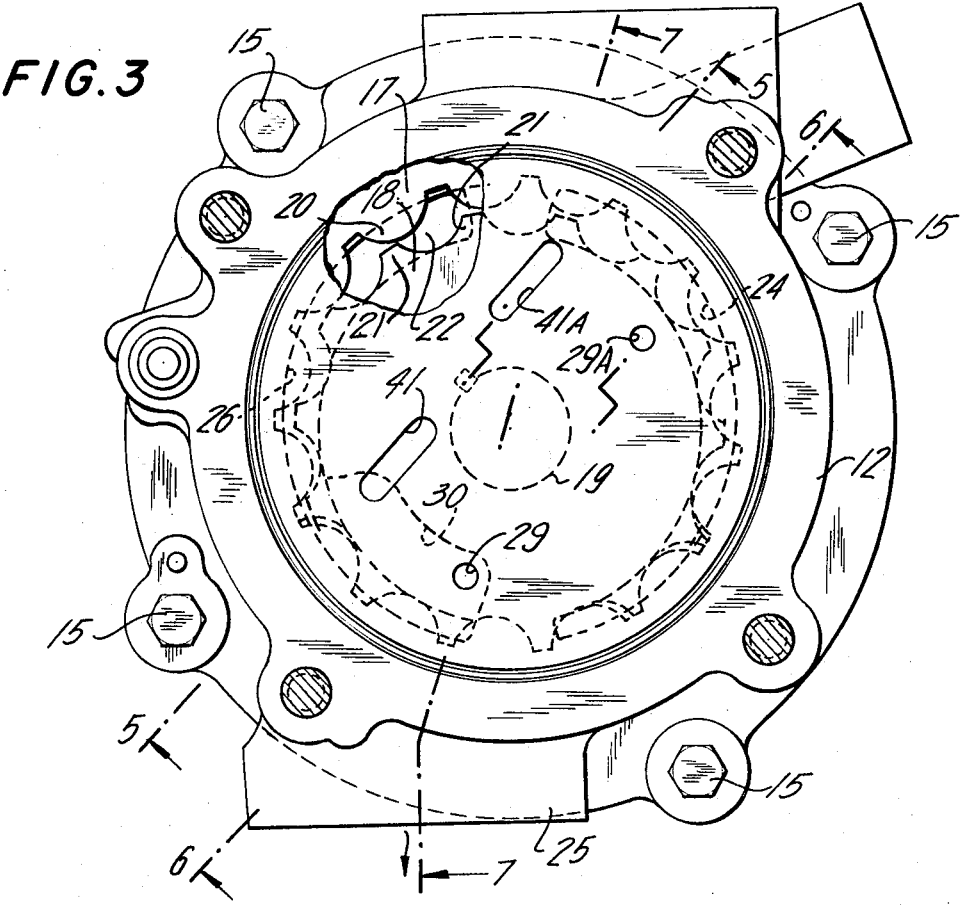
FIG. 3 is a sectional view taken substantially along line 3—3 of FIG. 2.

Now referring to the drawings and more specifically to FIG. 1, the reference number 10 generally designates a fluid metering and pumping apparatus according to this invention. While the fluid metering and pumping apparatus 10 is shown in the drawings and hereinafter described as incorporating a "Gerotor" type liquid pump, the invention is not limited to such pumping device. It is within the contemplation of the present invention that the invention has application to any assembly having two members connected to rotate at different angular velocities. In a slightly more narrow scope of the present invention the liquid metering feature can be employed with any pumping device having toothed rotors constructed and arranged to rotate at different angular velocities and form working chambers which alternately expand and contract to pump a liquid.

As shown in FIGS. 1 and 7, fluid metering and pumping apparatus 10 comprises a housing 11 having a body portion 12 and end walls 13 and 14 secured to the body portion by bolts 15. The body portion 11 has a circular recess 16 adjacent end wall 14 to form with the latter a pump cavity. An internal toothed rotor or gear 17 is supported by the walls of recess 16 for rotation in the pump cavity. An external drive rotor or gear 18 is disposed in meshing relationship with internal gear 17. The external drive gear 18 is keyed, or in some other suitable way connected, to a drive shaft 19 which is journalled in housing 11 in eccentric relationship to the axis of rotation of internal gear 17. As clearly shown in FIG. 7, drive shaft 19 extends into housing 11, through end wall 13, to a point short of end wall 14. In conformity with the typical requirements of a "Gerotor" type pump, the teeth 20 and 21 of gears 17 and 18, respectively, are generated and the external gear 18 provided with one less tooth than internal gear 17 so that a working or pumping chamber 22 are formed between the meshing teeth 20 and 21, which chambers 22 alternately expand and contract in volume as the gears 17 and 18 rotate.

The housing 11 as best shown in FIG. 7, is provided with an inlet or suction passageway 23 which communicates at one end to a source (not shown) of liquid, such as lubrication resorvoir, and, at the opposite end, with an arcuate shaped suction inlet port 24 in the bottom of recess 16. An outlet or discharge passageway 25 is provided in housing 11 opposite suction passageway 23, which discharge passageway communicates, at one end, with a place of use or storage (not shown), such as the rotary, internal combustion engine, and, at the opposite end, with an arcuate shaped discharge or outlet port 26 formed in the bottom of recess 16. The outlet port 26 is dimensioned to decrease in volume as the volume of working chambers 22 contract while inlet port 24 increases in volume as the volume of working chambers 22 expand as the gears 17 and 18 rotate. Communication between the inlet port 24 and outlet port 26, through the working chambers 22, is prevented by a face plate 27 which is secured to internal gear 17 and against which the adjacent end face of external gear 18 abuts.

The liquid pump of the "Gerotor" type, herein described operates to pump a liquid when drive shaft 19 is rotated by a suitable source of rotary power, such as an electric or fluid motor or the like. The rotation of drive shaft 19 rotates external drive gear 18 which, in turn, rotatively drives internal gear 17 with which it is in mesh. Since external drive gear 18 has one less tooth than internal gear 17 and is eccentrically mounted relative to the axis of rotation of the internal gear, the working or pumping chambers 22 which are formed by adjacent meshing teeth 20 and 21 of gears 17 and 18, respectively, progressively expand in volume to create a partial vacuum to draw in liquid to be pumped from inlet port 24, via suction passageway 23, and progressively contract in volumetric size to expel liquid from the working chambers into outlet port 26 from where the pressurized liquid passes, through the discharge passageway 25, to the place of use or storage (not shown). The slippage between the meshing teeth 20 and 21 results in relative rotation between gears 17 and 18 so that the same teeth mesh every N number of revolutions of the internal gear 18, which number of revolutions N corresponds to the number of teeth 21 on the external drive gear 18.

The fluid metering and pumping apparatus 10, as thus far described, is a substantially conventional "Gerotor" pump of the type manufactured by W. H. Nichols Company of Waltham, Mass., and Hydro-Comp., Inc. of Hopkins, Minn. In accordance with the present invention, a fluid metering means is incorporated in the apparatus 10 to supply a small quantity of the pumped liquid to a place of use or storage, such as the apex seals of a rotary combustion engine.

Figure 4:
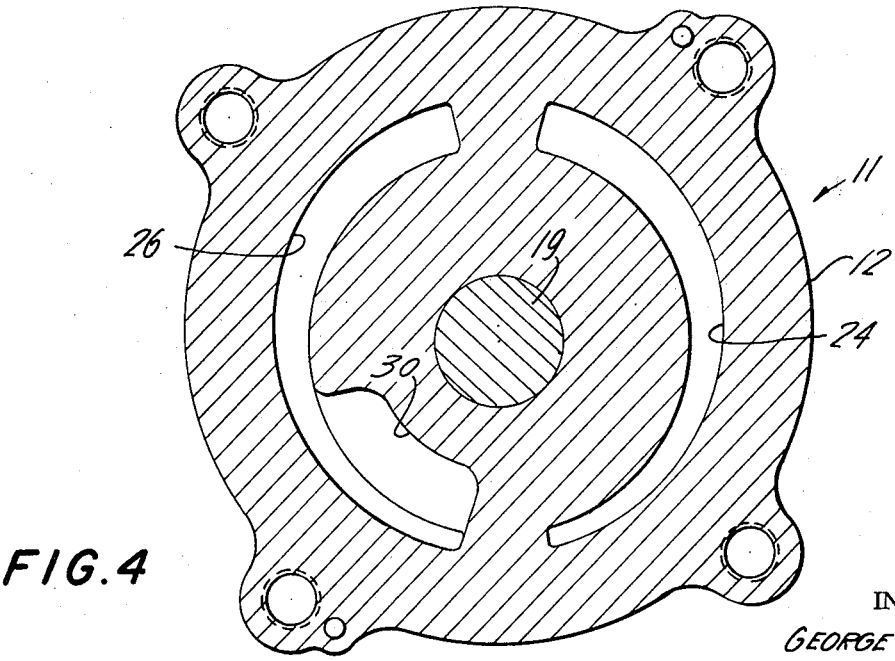
FIG. 4 is a sectional view taken substantially along line 4—4 of FIG. 2.

The fluid metering means comprises, as best shown in FIGS. 2, 3, 4, 5, and 6, suitable passageway means in both internal gear 17 and external gear 18 which are located relative to each other so as to come into registry with each other and outlet port 26 once in every predetermined amount of angular distance of movement of external gear 18. More specifically, the fluid metering means of this invention comprises passageway 28 extending, through external gear 18, substantially parallel to the axis of rotation of gear 18. A hole or passageway 29 of substantially the same size as passageway 28 is provided in face plate 27 of internal gear 17. As shown in FIG. 2, both passageways 28 and 29 are so located radially outwardly of their respective axes of rotation that in only one position are the passageways in full registry with each other during relative rotation of gears 17 and 18. To communicate passageway 28 with a source of pressurized fluid, a bypass groove 30 is formed in the bottom of recess 16 to communicate with outlet port 26 and receive liquid discharging from the pump. Bypass groove 30 is dimensioned to extend radially inwardly from outlet port 26 to be in the path of rotation passageway 28 and thereby provide for intermittent registry of the passageway 28 with bypass groove 30 and passage of pressurized liquid from the latter into passageway 28 and, when in registry, passageway 29.

Also, as best shown in FIG. 2, a passageway 31 is formed in end wall 14 to extend substantially parallel to the axes of rotation of gears 17 and 18 and located to lie in the path of rotation of passageway 29 to intermittently come into register, at one end, with the latter as internal gear 17 rotates. The opposite end of passageway 31 may be connected, through suitable conduits (not shown), directly to a place of use or storage without departing from the scope and spirit of this invention. However, to provide very accurate adjustment of the amount of liquid bled from outlet port 26, passageway 31 is shown as communicating with the bore or cylinder 32 of a piston-cylinder measuring assembly 33, more fully described hereinafter.

As thus far described, it is evident that, as internal gear 17 and external gear 18 rotate relative to each other and housing 11, arcuate groove 30 and passageways 28, 29, and 31 come into communication with each other only once in every fourteen revolutions of external drive gear 18 (external gear has 14 teeth while the internal gear has 15 teeth). This intermittent intercommunication of the aforesaid passageways provides for bleeding a very small amount of liquid from outlet port 26 to a place of use or storage, which amount varies in direct proportion to the variations in angular velocity of driven external gear 18. The amount of bled liquid is small enough so as not to materially affect the amount of liquid discharged from outlet port 26 to the place of use or storage of pumped liquid (not shown).

The piston-cylinder measuring assembly 33 comprises, in addition to cylinder 32, a plunger or piston 34 which is free to reciprocate within cylinder 32. The length of travel of piston 34 and, hence, the volume of liquid which can be trapped in cylinder 32 at opposite ends of piston 34, is variable by a pin 35 slidably disposed in one end of cylinder 32 and forming one of the end walls of cylinder 32. The pin 35 is axially adjusted relative to cylinder 32 by a screw 36 which is turned into a threaded bore 37 in housing 11. The bore 37 extends coaxially with cylinder 32 and pin 35 so that screw 36 abuts pin 35. A spring 38 biases pin 35 into abutment against screw 36 so that pin 35 follows the rectilinear movement of screw 36. The screw 36 is locked in a desired position of adjustment by a locknut 39. The assembly 33 also includes a passageway 40 which communicates with cylinder 32 adjacent the end of piston 34 opposite from the piston end adjacent passageway 31. As best shown in FIG. 5, passageway 40 extends in housing 11 from cylinder 32 in substantial parallelism with passageway 31 to an elongated notch 41 in the surface of face plate 27 adjacent end wall 14 of the housing. The notch 41 is so positioned that, when it is carried by internal gear 17 into communication with passageway 40, it also connects with one of a pair of bleed discharge ports 42 and 42A (see FIG. 1). The bleed discharge ports 42 and 42A are each, in turn, threaded to receive one end of a discharge conduit (not shown) which extends to a place of use or storage of bled liquid. When as previously described passageways 28, 29, and 31 momentarily come into communication with outlet port 26, via groove 30, during relative rotation of gears 17 and 18, pressurized discharge liquid is conducted to cylinder 32 which causes piston 34 to translate in a direction toward pin 35. Some of the liquid trapped in cylinder 32 and passageway 40 during a previous cycle of operation is forced by the movement of piston 34 from cylinder 32, passageway 40, notch 41 into and through discharge port 42. To effect rectilinear movement of piston 34 in the opposite direction, the fluid metering means includes a second set of passageways 28A, 29A, 31A, and 40A and notch 41A similar to and corresponding to passageways 28, 29, 31, and 40 and notch 41. The second set of passageways 28A, 29A, 31A, and 40A and notch 41A are so arranged that once in every 14 revolutions of external gear 18 the end of cylinder 32, adjacent pin 35, is brought into communication with outlet port 26 to receive pressurized liquid, via groove 30, while simultaneously the opposite end of cylinder 32 is brought into communication with discharge port 42A to discharge some of the liquid trapped in cylinder 32 and passageway 31 into discharge port 42A as piston 34 is forced to translate in a direction away from pin 35.

It is believed now readily apparent that the present invention provides a novel fluid metering apparatus which is relatively simple and automatically varies its discharge in direct ratio to changes in r.p.m. of the apparatus. It is an apparatus which is capable of incorporation in any type of pumping apparatus which utilizes a plurality of rotary members rotating at different speeds without material alteration of the pump structure or material change in its discharge flow rates.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:
1. Fluid metering and pumping device comprising:
  (a) housing;
  (b) an internal gear means mounted within said housing;
  (c) an external gear means disposed within the housing in eccentric, meshing relationship with said internal gear means and having a lesser number of teeth than said internal gear means so that rotation of the gears form fluid working chambers between the meshing gear teeth which alternately expand and then contract in volume;
  (d) inlet port means and outlet port means communicating with the fluid working chambers to draw fluid from the inlet port means into the working chambers during expansion of the working chambers and force fluid from such chambers into the outlet port means during contraction of the working chambers; and,
  (e) outlet passageway means located in said internal and external gear means so as to come into registry with each other and the outlet port means only once in every predetermined number of plural revolutions of the internal gear means to bleed-off a portion of the pumped fluid from the outlet port means to a place of use or storage.

2. The device of claim 1 wherein the housing, internal and external gear means, inlet port means and outlet means are constructed and arranged to form a gerotor pump.

3. The apparatus of claim 1 wherein a double-acting piston and cylinder means is provided and wherein outlet passage way means includes a pair of circumferentially spaced passageways communicating with opposite ends of the double-acting piston cylinder means to effect reciprocative movement of the piston within the cylinder when each pair of spaced passageways come into registry to directly communicate the working chambers alternately with opposite sides of the piston to reciprocate said piston and force preselected amounts of fluid through the outlet means to a place of use or storage.

4. The apparatus of claim 1 wherein said internal gear means has a side portion extending normal to the gear axis and in surface to surface contact with the adjacent side portion of the external gear means and wherein said outlet passageway means includes at least one passageway in the side portion of the internal gear means and one passageway in the external gear means located to register with each other every predetermined number of revolutions of the internal gear.

5. The apparatus of claim 1 wherein external gear means has one less tooth than said internal gear means.

6. Fluid metering and pumping device comprising:
  (a) housing;
  (b) an internal gear mounted within said housing for rotation;
  (c) an external gear disposed in eccentric meshing relationship with said internal gear and having one less tooth than said internal gear means so that rotation of the gears relative to each other form working chambers between the meshing gear teeth which alternately expand and contract in volume;
  (d) inlet port means and outlet port means in said housing communicating with the fluid working chambers to draw fluid from the inlet port means into the working chambers during expansion of the working chambers and force fluid from such chambers into the outlet port means during contraction of the working chambers; and,
  (e) outlet passageway means including passages in said internal and external gears located to come into registry with each other and the outlet port means only once in every predetermined number of plural revolutions of the internal gear to bleed-off a portion of the pumped fluid to a place of use or storage.

7. The apparatus of claim 6 wherein one of the internal gear and external gear drives the other in a sliding-meshing relationship so that there is relative rotation between the gears.

8. The apparatus of claim 6 wherein said internal gear has a side portion extending normal to the gear axis and in surface abutment against the side portion of the external gear and wherein said outlet passageway means includes at least one passageway in the said side portion of the internal gear and one passageway in the external gear located to communicate to register with each other at every predetermined number of revolutions of the internal gear.

9. The apparatus of claim 6 wherein said internal gear is cup-shaped and dimensioned to receive therein the external gear in endwise abutment against the internal gear, the passages of the outlet passageway means in the external and internal gears extend parallel to the axis of the rotation of said gear and radially spaced from their respective axis of rotation to come into registry with each other and outlet port means.

10. The apparatus of claim 6 wherein communication between the outlet passage means and the outlet port means is provided for by a by-pass means formed in the housing.

11. The apparatus of claim 6 wherein a double-acting piston and cylinder means is mounted on said housing, the cylinder being in communication at opposite ends thereof with a place of metered fluid use or storage, and wherein said outlet passageway means includes two pairs of circumferentially spaced passages disposed so that one passage of each pair of passages alternately communicates opposite ends of the cylinder with the working chambers to deliver pumped fluid to the latter and effect thereby reciprocation of the piston, the other passage of each pair of passages being disposed to alternately communicate opposite ends of the cylinder with a place of fluid use or storage so as to conduct fluid from the cylinder to the place of use or storage as the piston reciprocates.

12. The apparatus of claim 11 wherein said internal gear has a wall against which the external gear is in endwise abutment and part of one passage of each pair of passages is formed by the housing and a recess in the adjacent surface of said wall.

13. Fluid metering and pumping device comprising:
    (a) housing having opposite end walls;
    (b) a cup-shaped internal gear mounted within said housing for rotation and in endwise abutment against said housing end walls;
    (c) an external gear disposed eccentrically within the internal gear in endwise abutment against the bottom of the internal gear and in driving meshing relationship with said internal gear;
    (d) the external gear having one less tooth than said internal gear means so that the gears rotate in the same direction and relative to each and form working chambers between the meshing gear teeth which alternately expand and contract;
    (e) inlet port means in one of said housing end walls communicating with a source of fluid to be pumped;
    (f) an outlet port means in one of said housing end walls communicating with a place of storage or use of pumped fluid;
    (g) a fluid bleed discharge passage means in said housing end wall opposite from the end wall containing said outlet port means;
    (h) a first passage means in said internal gear offset from the axis of rotation;
    (i) a second passage means in said external gear offset from the axis of rotation; and,
    (j) said first and second passage means being located in their respective internal and external gears to register with each other and with the fluid bleed, discharge passage means and the outlet port means only once in every predetermined number of plural revolutions of the external gear to thereby bleed part of the pump fluid from the outlet port means to the fluid bleed discharge passage means.

14. The apparatus of claim 13 wherein a double-acting piston and cylinder means is mounted on the housing end wall, wherein said fluid bleed discharge passage means includes a bleed discharge port and a pair of spaced passages each communicating with opposite ends of said double-acting piston cylinder means and alternately with the bleed discharge port, and wherein said first and second passage means each includes a pair of circumferentially spaced passageways which alternately communicate with said third and fourth passages to thereby effect reciprocative movement of said piston within said cylinder of said double-acting piston and cylinder means once every predetermined number of revolutions of the external gear.

15. A fluid metering and pumping apparatus comprising:
    (a) housing;
    (b) rotary means within said housing and including means defining a plurality of fluid working chambers each of which successively expand and contract in volumetric size as the rotary means rotates within said housing;
    (c) inlet port means and outlet port means in said housing communicating with the fluid working chambers to draw fluid from the inlet port means into the working chambers during expansion of the working chambers and force fluid from such chambers into the outlet port means during contraction of the working chambers; and
    (d) metering outlet passageway means having the flow of fluid therethrough controlled by said rotary means by effecting registry of the metering outlet passageway means with the outlet port means only once in every predetermined plural revolutions of the rotary means to thereby bleed-off a relatively small portion of the fluid discharging from the outlet port means to a place of use or storage.

16. The apparatus of claim 15 wherein said rotary means comprises first and second gears which mesh with each other.

17. The apparatus of claim 16 wherein said gears comprise an internal toothed gear and an external geared tooth mounted eccentrically to and in mesh with the internal toothed gear, the external toothed gear having at least one less tooth than the internal tooth gear.

References Cited
UNITED STATES PATENTS

| | | | |
|---|---|---|---|
| 3,242,867 | 3/1966 | Mosbacher | 418—171 X |
| 3,137,234 | 6/1964 | Mosbacher | 418—171 X |
| 3,227,325 | 1/1966 | Bates | 222—334 X |
| 3,583,839 | 6/1971 | Brundage | 418—171 X |
| 2,272,313 | 2/1942 | Waters | 73—422 R |

SAMUEL F. COLEMAN, Primary Examiner

N. L. STACK, Jr., Assistant Examiner